(12) United States Patent
Park

(10) Patent No.: US 11,371,406 B2
(45) Date of Patent: Jun. 28, 2022

(54) LOW-TEMPERATURE DE-NOX CATALYST FOR TREATMENT OF EXHAUST GAS FROM STATIONARY SOURCE AND METHOD OF MANUFACTURING SAME

(71) Applicant: Hanseo University Academic Cooperation Foundation, Seosan-si (KR)

(72) Inventor: Hea Kyung Park, Seoul (KR)

(73) Assignee: HANSEO UNIVERSITY ACADEMIC COOPERATION FOUNDATION, Seosan-si (KR)

( * ) Notice: Subject to any disclaimer, the term of this patent is extended or adjusted under 35 U.S.C. 154(b) by 0 days.

(21) Appl. No.: 17/236,610

(22) Filed: Apr. 21, 2021

(65) Prior Publication Data
US 2022/0162970 A1    May 26, 2022

(30) Foreign Application Priority Data

Nov. 25, 2020  (KR) .................. 10-2020-0159869

(51) Int. Cl.
| | | |
|---|---|---|
| *B01J 21/06* | (2006.01) | |
| *B01J 23/10* | (2006.01) | |
| *B01J 23/22* | (2006.01) | |
| *B01J 23/30* | (2006.01) | |
| *F01N 3/08* | (2006.01) | |
| *F01N 3/20* | (2006.01) | |

(52) U.S. Cl.
CPC .......... *F01N 3/0842* (2013.01); *B01J 21/063* (2013.01); *B01J 23/10* (2013.01); *B01J 23/22* (2013.01); *B01J 23/30* (2013.01); *F01N 3/208* (2013.01)

(58) Field of Classification Search
CPC ............ B01D 53/9418; B01D 53/9422; B01D 2255/2065; B01D 2255/2068; B01D 2255/20723; B01D 2255/20776; B01D 2257/402; B01D 2257/404; B01D 2258/012; B01J 21/063; B01J 23/22; B01J 23/30; B01J 23/10; B01J 37/031; B01J 37/0215; B01J 37/08; B01J 2231/60; B01J 2523/3712; B01J 2523/3725; B01J 2523/55; F01N 3/2066
See application file for complete search history.

(56) References Cited

U.S. PATENT DOCUMENTS

| 4,085,193 | A | * | 4/1978 | Nakajima | ........... B01D 53/9418 502/328 |
| 5,198,403 | A | * | 3/1993 | Brand | .................... B01J 35/108 502/208 |
| 2007/0142224 | A1 | * | 6/2007 | Akhtar | ................... B01J 23/002 502/309 |
| 2020/0362740 | A1 | * | 11/2020 | Quinet | ................... B01J 23/002 |

FOREIGN PATENT DOCUMENTS

| DE | 3 906 136 C | * | 8/1990 | ......... B01D 53/9418 |
| EP | 3 482 824 A1 | * | 5/2019 | ......... B01D 53/9418 |
| EP | 3 482 825 A1 | * | 5/2019 | ............ B01J 37/031 |
| KR | 101113380 B1 | | 3/2012 | |
| KR | 101426601 B1 | | 8/2014 | |
| KR | 20150129852 A | | 11/2015 | |
| KR | 1020160136350 A1 | | 11/2016 | |

* cited by examiner

*Primary Examiner* — Timothy C Vanoy
(74) *Attorney, Agent, or Firm* — STIP Law Group, LLC

(57) ABSTRACT

Proposed are a low-temperature de-NOx catalyst for treating exhaust gas from a stationary source and a method of manufacturing the same. The low-temperature de-NOx catalyst can promote the reduction reaction of nitrogen oxide even at a low temperature despite supporting vanadium in a small amount, can increase resistance to sulfur poisoning, and can be easily manufactured in a manner that does not deteriorate nitrogen oxide removal efficiency even after long-term operation because it prevents secondary environmental pollution due to the treated gas and has superior abrasion resistance, thereby contributing to commercialization.

8 Claims, No Drawings

LOW-TEMPERATURE DE-NOX CATALYST FOR TREATMENT OF EXHAUST GAS FROM STATIONARY SOURCE AND METHOD OF MANUFACTURING SAME

CROSS REFERENCE TO RELATED APPLICATION

The present application claims priority based on Korean Patent Application No. 10-2020-0159869 filed on Nov. 25, 2020, the entire content of which is incorporated herein for all purposes by this reference.

BACKGROUND OF THE DISCLOSURE

1. Technical Field

The present disclosure relates to a low-temperature de-NOx catalyst for selective catalytic reduction for the treatment of exhaust gas from a stationary source and a method of manufacturing the same, and more particularly to a low-temperature de-NOx catalyst for selective catalytic reduction, which is capable of efficiently removing nitrogen oxide from exhaust gas of a coal-fired power plant containing a large amount of sulfur oxide, dust, etc. at a low operating temperature and a method of manufacturing the same.

2. Description of the Related Art

Nitrogen oxide ($NO_x$) contained in exhaust gas emitted from stationary sources such as power plants, boilers, incinerators, and the like and mobile sources such as vehicles, ships and the like is well known to be a substance that causes air pollution, along with sulfur oxide ($SO_x$), dust, dioxins, and volatile organic compounds.

Nitrogen oxide is mainly generated through the reaction of nitrogen and oxygen in the presence of excess air in a high-temperature combustion facility, and includes nitrogen monoxide (NO), nitrogen dioxide ($NO_2$), and nitrous oxide. Nitrogen monoxide is a colorless, odorless gas and is almost insoluble in water, and the direct effect thereof on the human body is not known with certainty, but nitrogen monoxide is less toxic than nitrogen dioxide and is oxidized into nitrogen dioxide by binding with atmospheric oxygen. Nitrogen dioxide is known to be a photochemical smog-causing compound, and is a reddish brown gas that is harmful to the human body. In addition, when gaseous sulfur oxide enters the human body, it reacts with water therein to generate sulfuric acid, which is very lethal to the human body and also causes acid rain. Therefore, in order to reduce the generation of such pollutants, techniques for efficiently removing pollutants along with techniques for reducing the generation of pollutants by improving combustion conditions, such as low-oxygen combustion, exhaust gas circulation, etc., have been developed.

Unlike other air pollutants, however, nitrogen oxide is inevitably generated during high-temperature combustion, and is a very stable compound. Hence, improving combustion techniques alone cannot sufficiently remove nitrogen oxide, so development of post-treatment technology for reducing the emission of pollutants from the generated exhaust gas has to be emphasized.

Such post-treatment technology includes selective catalytic reduction (SCR) technology using a catalyst and selective non-catalytic reduction (SNCR) technology not using a catalyst, and the former technology is a process of decomposing nitrogen oxide in exhaust gas into nitrogen and water by supplying a reducing agent such as urea, ammonia, hydrocarbons, etc., in the presence of a catalyst, and the latter technology is a process that uses the above reaction in the absence of a catalyst.

In selective catalytic reduction, there are a method of using a reducing agent and a method of direct decomposition in the presence of a catalyst without the use of a reducing agent. The direct decomposition method using a catalyst is the best method of directly decomposing nitrogen oxide in exhaust gas into nitrogen and oxygen in the presence of a catalyst, but requires a high-temperature reaction temperature and causes rapid deterioration of catalytic activity, so a method of removing nitrogen oxide using a reducing agent is mainly studied. This is a method of generating nitrogen and water through selective reaction with nitrogen oxide using a reducing agent in the presence of a catalyst, which is regarded as the most promising post-treatment technology from technical and economic aspects.

In general, a catalyst for selective catalytic reduction is mainly configured using, as a carrier, titania, alumina, silica, zirconia, etc., and as a active component, metal oxide, zeolite, alkaline earth metal, rare-earth metal, etc., and oxides of vanadium, molybdenum, nickel, tungsten, iron, and copper are widely used. In particular, vanadium pentoxide ($V_2O_5$) and titanium dioxide ($TiO_2$) account for most commercially available flue gas de-NOx techniques.

A conventional catalyst for purifying exhaust gas using ammonia as a reducing agent not only exhibits very high selectivity to nitrogen oxide, but is also capable of promoting a reaction between nitrogen monoxide and ammonia in the presence of oxygen, and is thus known to be the most advantageous in view of reducing the emission of nitrogen oxide. Such an ammonia de-NOx catalyst exhibits high activity at high temperatures, but exhibits poor de-NOx efficiency due to low activation energy at low temperatures, and thus the exhaust gas has to be reheated to a temperature at which the catalyst is able to exhibit activity, so enormous amounts of energy are consumed, which is undesirable.

In addition, most fuels except liquefied natural gas (LNG) contain sulfur, and most of sulfur is discharged as sulfur dioxide ($SO_2$) during combustion. A conventional de-NOx catalyst such as a vanadium/titanium dioxide catalyst exhibits its high ability to remove nitrogen oxide at 250° C. to 400° C., but when sulfur dioxide is present in exhaust gas, ammonium sulfate salts ($NH_4HSO_4$, $(NH_4)_2SO_4$) are formed due to side reactions between ammonia as the reducing agent and sulfur dioxide, as shown in Scheme 1 below. The lower the temperature, the faster the formation of the ammonium sulfate salt, and the ammonium sulfate salt is deposited on the surface of the catalyst, thus deteriorating the activity of the catalyst and causing corrosion and clogging of the lower device of the reactor.

$$2SO_2 + O_2 \rightarrow 2SO_3$$

$$NH_3 + SO_3 + H_2O \rightarrow NH_4HSO_4$$

$$2NH_3 + SO_3 + H_2O \rightarrow (NH_4)_2SO_4 \quad \text{[Scheme 1]}$$

Therefore, in order to suppress the formation of such ammonium sulfate salts, sulfur dioxide is removed using a desulfurization unit, and a de-NOx unit is disposed downstream thereof in some facilities. However, in the desulfurization unit, water is supplied for the purpose of improving processing efficiency. In this case, the temperature rapidly decreases after the desulfurization process, so reheating of the exhaust gas using a duct burner is required in order to sufficiently increase the ability to remove nitrogen oxide. The energy used for such reheating is very large, thus negating economic benefits. In addition, even when sulfur dioxide is removed through a desulfurization unit, some sulfur dioxide may remain, and thus ammonium sulfate may be formed in the downstream de-NOx unit, resulting in deteriorated activity of the de-NOx catalyst.

In order to meet the increasingly stringent emission control standards for air pollutants in coal-fired power plants, attempts are being made to improve a de-NOx (SCR) unit for removing nitrogen oxide from exhaust gas discharged during boiler combustion, an electric dust collector for removing dust, and a flue gas desulfurization (FGD) unit for removing sulfur oxide. Moreover, in order to ensure the economic feasibility of power plant operation, diversification of coal sources and the use of cheap and low-quality coal fuel containing dust and sulfur in large amounts are inevitable, and thus the de-NOx catalyst may be damaged, the de-NOx performance of the catalyst may be deteriorated due to poisoning, and the replacement cycle may be shortened.

Therefore, in order to efficiently operate a coal-fired power plant from environmental and economic aspects, a de-NOx catalyst has to be provided downstream of the desulfurization unit. Since sulfur is not completely removed even in the presence of the catalyst downstream of the desulfurization unit, high ability to withstand sulfur oxide is required. Also, as described above, exhaust gas, the temperature of which is significantly lowered, passes through the de-NOx catalyst layer, so a considerable amount of fuel for again increasing the temperature is consumed in order to apply a typical high-temperature active catalyst of the type that has been provided downstream of an existing boiler. Hence, the development of a catalyst exhibiting high activity in a low temperature range is urgently required.

In summary, for an efficient de-NOx process in a coal-fired power plant, it is required to develop a de-NOx catalyst having high ability to remove nitrogen oxide in a low temperature range and high ability to withstand the presence of sulfur dioxide. Below is a description of documents related to application of de-NOx catalysts to de-NOx systems.

Korean Patent No. 10-1113380 discloses an de-NOx catalyst containing manganese, cerium and zeolite for selective reduction of nitrogen oxide at a low temperature, Korean Patent Application Publication No. 10-2015-0129852 discloses a de-NOx catalyst using an octahedral molecular sieve containing cerium oxide and manganese oxide for selective reduction of nitrogen oxide at a low temperature, and Korean Patent No. 10-1426601 discloses a technique for increasing the ability of a de-NOx catalyst to remove nitrogen oxide at a low temperature, suitable for the reduction of nitrogen oxide, using a catalyst obtained by adding vanadium-antimony to an intermediate product of crystalline anatase titanium dioxide named titanic acid or orthotitanic acid.

However, the de-NOx catalysts described above not only cause problems related to resistance to sulfur dioxide ($SO_2$) or water ($H_2O$), but also generate secondary pollutants such as $NO_2$, $N_2O$ and the like due to the oxidation of $NH_3$ and NO. In particular, these catalysts are expected to be difficult to apply to practical use in the near future due to the short time during which nitrogen oxide removal efficiency is maintained and the use of expensive manganese (Mn) in a large amount.

CITATION LIST

Patent Literature (Patent Document 1) Korean Patent No. 10-1113380 (Sep. 17, 2009)

(Patent Document 2) Korean Patent Application Publication No. 10-2015-0129852 (Nov. 20, 2015)

(Patent Document 3) Korean Patent No. 10-1426601 (Mar. 26, 2014)

SUMMARY OF THE DISCLOSURE

Accordingly, the present disclosure has been made keeping in mind the problems encountered in the related art, and an objective of the present disclosure is to provide a de-NOx catalyst for selective catalytic reduction, which may promote the reduction reaction of nitrogen oxide even at a low temperature, may increase resistance to sulfur poisoning, and may not deteriorate nitrogen oxide removal efficiency even after long-term operation because it prevents secondary environmental pollution due to the treated gas and has superior abrasion resistance, and a method of manufacturing the same.

In order to accomplish the above objective, an embodiment of the present disclosure provides a method of manufacturing a low-temperature de-NOx catalyst for selective catalytic reduction, including: (a) preparing a first precursor aqueous solution containing a cerium precursor and a niobium precursor; (b) continuously adding a titanium precursor aqueous solution to the first precursor aqueous solution and performing co-precipitation to form a co-precipitate; (c) coating a metal support with the co-precipitate and then performing primary drying and calcination; (d) preparing a second precursor aqueous solution containing a vanadium precursor and a tungsten precursor; (e) supporting the second precursor aqueous solution on the metal support obtained in step (c); and (f) subjecting the supported metal support obtained in step (e) to secondary drying and calcination.

In a preferred embodiment of the present disclosure, the co-precipitate obtained in step (b) includes 100 parts by weight of the titanium precursor, 3 parts by weight to 10 parts by weight of the cerium precursor, and 3 parts by weight to 10 parts by weight of the niobium precursor.

In a preferred embodiment of the present disclosure, the vanadium precursor of the second precursor aqueous solution is contained in an amount of 12 parts by weight to 18 parts by weight based on 100 parts by weight of the titanium precursor, and the tungsten precursor of the second precursor aqueous solution is contained in an amount of 3 parts by weight to 15 parts by weight based on 100 parts by weight of the titanium precursor.

In a preferred embodiment of the present disclosure, the co-precipitation in step (b) is performed using a continuous-type homogenizer or a batch-type homogenizer.

In a preferred embodiment of the present disclosure, the co-precipitation in step (b) is performed at 20° C. to 100° C. and at a rotation speed of 5,000 rpm to 20,000 rpm.

In a preferred embodiment of the present disclosure, the calcination of steps (c) and (f) is performed at 450° C. to 600° C. for 1 hour to 5 hours.

Another embodiment of the present disclosure provides a low-temperature de-NOx catalyst for selective catalytic reduction, manufactured using the method described above and including a catalyst carrier containing titanium and catalyst particles in which vanadium and tungsten are supported on the catalyst carrier and in which cerium and niobium are contained.

Still another embodiment of the present disclosure provides a low-temperature de-NOx catalyst for selective catalytic reduction, manufactured using the method described above and including a catalyst carrier containing titanium and catalyst particles in which vanadium and tungsten are supported on the catalyst carrier and in which cerium and niobium are contained, in which de-NOx efficiency of 85% or more is exhibited through a de-NOx reduction reaction of exhaust gas containing 5 ppm to 200 ppm of sulfur oxide at 170° C. to 180° C.

According to the present disclosure, a low-temperature de-NOx catalyst for selective catalytic reduction and a method of manufacturing the same are provided. The low-temperature de-NOx catalyst for selective catalytic reduction manufactured using the manufacturing method of the present disclosure can promote the reduction reaction of nitrogen oxide even at a low temperature by controlling the optimal amount of vanadium that is supported, can increase resistance to sulfur poisoning, and can be easily manufactured in a manner that does not deteriorate nitrogen oxide removal efficiency even after long-term operation because it prevents secondary environmental pollution due to the treated gas and has superior abrasion resistance, thereby effectively contributing to commercialization.

DESCRIPTION OF SPECIFIC EMBODIMENTS

Unless otherwise defined, all technical and scientific terms used herein have the same meanings as those typically understood by those skilled in the art to which the present disclosure belongs. Generally, the nomenclature used herein is well known in the art and is typical.

As used herein, when any part is said to "comprise" or "include" any element, this does not mean that other elements are excluded, and such other elements may be further included unless otherwise specifically mentioned.

An aspect of the present disclosure pertains to a method of manufacturing a low-temperature de-NOx catalyst for selective catalytic reduction, including (a) preparing a first precursor aqueous solution containing a cerium precursor and a niobium precursor, (b) continuously adding a titanium precursor aqueous solution to the first precursor aqueous solution and performing co-precipitation to form a co-precipitate, (c) coating a metal support with the co-precipitate formed above, followed by primary drying and calcination, (d) preparing a second precursor aqueous solution containing a vanadium precursor and a tungsten precursor, (e) supporting the second precursor aqueous solution prepared above on the metal support obtained in step (c), and (f) subjecting the supported metal support obtained in step (e) to secondary drying and calcination.

A conventional method used to manufacture a multi-component metal oxide catalyst is typically performed in a manner in which two or more metal solutions, the pH of each of which is adjusted for co-precipitation, are mixed and precipitation is carried out to afford a catalyst. For example, metal precursors to be co-precipitated are prepared by being dissolved in a solution, the pH of which is adjusted as necessary, after which any one solution among individual metal precursor solutions is dropped into the other remaining solution to perform co-precipitation. When co-precipitation is performed in this way, the components of the co-precipitation solution are mixed at a component ratio different from the final target component ratio, and the catalyst is co-precipitated in a manner in which the concentration thereof gradually approaches the final target concentration according to the progress of co-precipitation. Hence, aggregation and imbalance in the metal component ratio in the co-precipitation solution occur, and due thereto, the component ratio of the particles is not constant in the co-precipitation step, during which the basic structure is formed, resulting in deteriorated activity.

Accordingly, in the present disclosure, the liquid-liquid contact between the first precursor aqueous solution and the titanium precursor is promoted through continuous mixing and high-speed dispersion, and a constant metal component ratio is maintained during the co-precipitation, thus obtaining a co-precipitate having a uniform metal composition ratio until the co-precipitation reaction is terminated from the beginning of the co-precipitation reaction, after which the co-precipitate thus obtained is mixed with the second precursor aqueous solution, and the metal component of the second precursor is supported on the co-precipitate using ultrasonication, whereby individual metal precursors are arranged and aligned using ultrasonic energy so that the metal components are more uniformly dispersed on the co-precipitate without aggregation. Ultimately, the reduction reaction of nitrogen oxide may be promoted even at a low temperature, and moreover, durability and resistance to sulfur poisoning of the catalyst may be improved, and nitrogen oxide removal efficiency may not be deteriorated even after long-term operation.

The method of manufacturing such a low-temperature de-NOx catalyst for selective catalytic reduction according to the present disclosure includes preparing a first precursor aqueous solution containing a cerium precursor and a niobium precursor [step (a)].

The first precursor aqueous solution is obtained by dissolving each of a cerium precursor and a niobium precursor in desalted water, and the amount of desalted water that is used is not limited, so long as it is able to sufficiently dissolve the cerium precursor and the niobium precursor. Preferably, each precursor is dissolved in an amount of 0.1 parts by weight to 40 parts by weight based on 100 parts by weight of desalted water.

The cerium precursor serves as a cocatalyst, and may be used without limitation, so long as it is a cerium precursor commonly used in the field of production of de-NOx catalysts, and preferable examples thereof include cerium nitrate [$Ce(NO_3)_3$], cerium acetate [$Ce(CH_3CO_2)_3$], cerium oxalate [$Ce_2(C_2O_4)_3$], cerium oxide ($CeO_2$), and the like.

Here, the cerium precursor may be contained in an amount of 3 parts by weight to 10 parts by weight, and preferably 5 parts by weight to 8 parts by weight, based on 100 parts by weight of a titanium precursor, which will be described later. If the amount of the cerium precursor is less than 3 parts by weight, dispersibility may increase, but oxygen storage capacity in the lattice may be decreased due to the insufficient amount of cerium. On the other hand, if the amount of the cerium precursor exceeds 10 parts by weight, particles may aggregate on the surface of the catalyst, resulting in deteriorated activity, making it difficult to form a catalyst with the increased amount thereof.

In addition, the niobium precursor is added to improve the low-temperature reactivity and resistance to sulfur poisoning in the catalyst and to increase the reactivity between vanadium, tungsten, and titanium, and is preferably niobium oxide ($Nb_2O_5$). The niobium precursor may be contained in an amount of 3 parts by weight to 10 parts by weight, and preferably 5 parts by weight to 8 parts by weight, based on 100 parts by weight of the titanium precursor. If the amount of the niobium precursor is less than 3 parts by weight, the activity may be low due to the insufficient amount of the active material in the catalyst, whereas if the amount thereof exceeds 10 parts by weight, particles may aggregate on the surface of the catalyst, resulting in deteriorated activity. As the amount thereof increases, the stability of catalyst formation may deteriorate.

Thereafter, the first precursor aqueous solution containing the cerium precursor and the niobium precursor is continuously added to a titanium precursor aqueous solution and co-precipitated while being dispersed at a high speed to form a co-precipitate [step (b)].

The titanium precursor aqueous solution is obtained by dissolving a titanium precursor in desalted water, and the amount of desalted water that is used is not limited, so long as it is able to sufficiently dissolve the titanium precursor, but the titanium precursor is preferably dissolved in an amount of 0.1 parts by weight to 40 parts by weight based on 100 parts by weight of desalted water.

The titanium precursor that is used may be crystalline titanium dioxide or amorphous titanic acid (orthotitanic acid), and due to the high specific surface area thereof, the titanium precursor acts as a support for components used as a main catalyst and a cocatalyst, and serves to increase the physical strength of the catalyst or increase the lifetime of the catalyst by improving heat resistance.

Here, amorphous titanic acid may be obtained by hydrolyzing a titanium sulfate [$TiO(SO_4)$] solution, and titanium oxide that is used may be an anatase type or a mixed type of anatase and rutile, but it is preferable to use an anatase type in order to decrease side reactions of ammonia and sulfur dioxide.

The continuous addition and high-speed dispersion may be performed under conditions of a temperature of 20° C. to 100° C. and a rotation speed of 5,000 rpm to 20,000 rpm, and within the above range, a uniform component ratio and uniform dispersion of the present disclosure may be realized.

The continuous addition and high-speed dispersion may be performed using an in-line homogenizer. For example, the first precursor aqueous solution and the titanium precursor aqueous solution are placed in the in-line homogenizer under conditions of an introduction amount per hour at which the time taken to introduce all of the first precursor aqueous solution and the time taken to introduce all of the titanium precursor aqueous solution become equal, thereby enabling continuous addition, mixing at a constant ratio, and high-speed dispersion. Here, the in-line homogenizer may be a continuous-type or batch-type homogenizer (in-line homogenizer).

As described above, the co-precipitate, in which the cerium precursor, the niobium precursor and the titanium precursor are co-precipitated through continuous addition and high-speed dispersion, is applied on a metal support using a typical process and device, dried, and then fired [step (c)].

Here, if the drying temperature is too low or if the drying time is too short, complete drying is impossible, and thus water may be contained in the micropores in the catalyst, resulting in deteriorated activity, whereas if the drying temperature is too high or if the drying time is too long, the activity of the catalyst may be deteriorated due to sintering. Hence, the metal support coated with the co-precipitate may be dried at a temperature ranging from room temperature to 120° C. for 1 hour to 24 hours.

In addition, the dried metal support is calcined in order to control the size and dispersibility of the active component.

If the calcination temperature is lower than 450° C. or if the calcination time is less than 1 hour, the material used as the precursor may not be properly removed, whereas if the calcination temperature exceeds 600° C. or if the calcination time exceeds 5 hours, the properties of the materials used as the catalytically active material and the catalyst support may change and thus durability may decrease, or a specific surface area may decrease, resulting in deteriorated nitrogen oxide removal efficiency.

The heat treatment may be performed using various types of furnaces, such as a tube furnace, a convection furnace, a grate furnace and the like, and is not particularly limited.

Thereafter, a second precursor aqueous solution containing a vanadium precursor and a tungsten precursor is prepared [step (d)].

The second precursor aqueous solution is obtained by dissolving each of the vanadium precursor and the tungsten precursor in desalted water, and the amount of desalted water that is used is not limited, so long as it is able to sufficiently dissolve the vanadium precursor and the tungsten precursor, but each precursor is preferably dissolved in an amount of 0.1 parts by weight to 40 parts by weight based on 100 parts by weight of desalted water.

The vanadium precursor is a catalytically active component, and may be used without limitation, so long as it is a vanadium precursor commonly used in the field of production of de-NOx catalysts, and preferable examples thereof include ammonium metavanadate ($NH_4VO_3$), vanadium oxytrichloride ($VOCl_3$), vanadium oxide ($V_2O_5$), and the like. More preferably, ammonium metavanadate ($NH_4VO_3$) is used.

Ammonium metavanadate ($NH_4VO_3$) is more environmentally friendly than other types of catalysts, and becomes vanadium pentoxide ($V_2O_5$) when thermally decomposed. Vanadium pentoxide not only has catalytic action that reduces nitrogen oxide in exhaust gas, but also has superior resistance to sulfur oxide and acts as a catalyst that oxidizes sulfur dioxide ($SO_2$) into sulfur trioxide ($SO_3$), so sulfur trioxide is converted into sulfuric acid ($H_2SO_4$) by binding with water vapor in exhaust gas, effectively removing sulfur dioxide from exhaust gas.

When using ammonium metavanadate as the vanadium precursor, the solubility of ammonium metavanadate is very low, so it is preferable that oxalic acid be added little by little to the ammonium metavanadate aqueous solution with stirring in order to increase the solubility thereof.

The vanadium precursor may be contained in an amount of 12 to 18 parts by weight, and preferably 14 parts by weight to 16 parts by weight, based on 100 parts by weight of the titanium precursor. If the amount of the vanadium precursor is less than 12 parts by weight, the effect of removing nitrogen oxide may be insufficient at low temperatures, whereas if the amount of the vanadium precursor exceeds 18 parts by weight, the powder may aggregate due to the excessive use thereof, and satisfactory efficiency may not be obtained even when the amount thereof is increased, which is undesirable from economic and environmental aspects.

Also, the tungsten precursor is a catalytically active component, and may be used without limitation, so long as it is a compound commonly used in the field of production of de-NOx catalysts for selective catalytic reduction, and preferable examples thereof include ammonium metatungstate [$(NH_4)_6W_{12}O_{39}$], ammonium paratungstate [$(NH_4)_{10}W_{12}O_{41}$] ammonium tungstate ($H_8N_2O_4W$) ammonium tetrathiotungstate ($H_8N_2S_4W$), tungsten oxide ($WO_3$), and the like.

The amount of the tungsten precursor may be 3 parts by weight to 15 parts by weight, and preferably 5 parts by weight to 10 parts by weight, based on 100 parts by weight of the titanium precursor. If the amount of the tungsten precursor is less than 3 parts by weight, the structural stabilization of titanium oxide or resistance to sulfur oxide may become poor, whereas if the amount of the tungsten precursor exceeds 15 parts by weight, the powder may aggregate due to the excessive use thereof, and satisfactory efficiency may not be obtained even when the amount thereof is increased, which is undesirable from economic and environmental aspects.

Vanadium of the vanadium precursor and tungsten of the tungsten precursor are transition metals, and lose electrons easily because the number of electrons occupying the inner electron orbit is incomplete, resulting in a cationic state. Accordingly, these metals form a compound with the titanium precursor to activate the selective catalytic reduction of the catalyst and improve impact resistance, heat resistance and corrosion resistance. In addition, since these metals react easily with oxygen to form an oxide passivation protective film, they are not easily oxidized, and are resistant to alkali, sulfuric acid, hydrochloric acid, and the like.

Thereafter, the metal support is supported with the second precursor aqueous solution [step (e)], after which the supported metal support is dried and fired under the same conditions as in step (c), thereby manufacturing a low-temperature de-NOx catalyst for selective catalytic reduction [step (e)].

The low-temperature de-NOx catalyst for selective catalytic reduction manufactured above is configured such that vanadium and tungsten, which are catalytically active materials, are uniformly dispersed and supported on the surface of the titanium carrier, and cerium and niobium are contained therein, making it possible to stably maintain the activity of removing nitrogen oxide at a low temperature from exhaust gas containing sulfur oxide.

Another aspect of the present disclosure pertains to a low-temperature de-NOx catalyst for selective catalytic reduction, manufactured using the above method and configured to include a catalyst carrier containing titanium and catalyst particles in which vanadium and tungsten are supported on the catalyst carrier and in which cerium and niobium are contained.

In the low-temperature de-NOx catalyst for selective catalytic reduction according to the present disclosure, vanadium and tungsten, which are catalytically active materials, are uniformly dispersed and supported at a constant ratio on the surface of the titanium-containing catalyst carrier without aggregation of catalyst particles, and cerium and niobium are contained therein, whereby de-NOx efficiency of 85% or more may be exhibited through a de-NOx reduction of exhaust gas containing sulfur oxide at 170° C. to 180° C. Here, the exhaust gas may contain 5 ppm to 200 ppm of sulfur oxide. A better understanding of the present disclosure may be obtained through the following examples. The following examples are merely set forth to illustrate the present disclosure, and are not to be construed as limiting the scope of the present disclosure.

EXAMPLE 1

5 g of cerium nitrate and 5 g of niobium oxide were mixed with 100 g of distilled water to prepare a first precursor aqueous solution, and a titanium precursor aqueous solution was prepared by mixing 100 g of $TiO_2$ (anatase type, having a specific surface area of 344.72 m²/g, and a particle size of 1.365 μm) with 1000 g of distilled water. The first precursor aqueous solution and the titanium precursor aqueous solution were added to individual inlets of an in-line continuous homogenizer (a UTL 25 digital in-line homogenizer, manufactured by IKA), after which the first precursor aqueous solution was supplied at a rate of 8.18 g/min, and simultaneously, the titanium precursor aqueous solution was supplied at a rate of 13.30 g/min. The homogenizer was rotated at 15,000 rpm for 1 second under atmospheric pressure. A co-precipitate obtained from the outlet of the in-line continuous homogenizer was applied on a three-dimensional metal support (YIDA, Ltd., China, 200 cpsi, 5 cm×5 cm×5 cm) in a typical wash-coating process (dip-sipping), followed by drying at 120° C. for 1 hour and then calcinating at 470° C. for 3 hours. A second precursor aqueous solution was prepared by mixing 14 g of ammonium metavanadate and 10 g of ammonium metatungstate with 100 g of distilled water. The calcined three-dimensional metal support was supported with the second precursor aqueous solution at room temperature for 30 minutes, dried at 120° C. for 1 hour, and then calcined at 470° C. for 3 hours, thereby obtaining a low-temperature de-NOx catalyst for selective catalytic reduction.

Examples 2 to 5 and Comparative Examples 1 to 7

Each low-temperature de-NOx catalyst for selective catalytic reduction was manufactured in the same manner as in Example 1, with the exception that the components in the amounts shown in Table 1 below were used.

TABLE 1

| Classification | Titanium precursor (g) | Cerium precursor (g) | Niobium precursor (g) | Vanadium precursor (g) | Tungsten precursor (g) |
|---|---|---|---|---|---|
| Example 1 | 100 | 5 | 5 | 14 | 10 |
| Example 2 | 100 | 5 | 5 | 14 | 5 |
| Example 3 | 100 | 5 | 5 | 16 | 10 |
| Example 4 | 100 | 5 | 5 | 16 | 5 |
| Example 5 | 100 | 10 | 5 | 14 | 10 |
| Comparative Example 1 | 100 | 5 | 5 | 10 | 10 |
| Comparative Example 2 | 100 | 5 | 5 | 18 | 1 |
| Comparative Example 3 | 100 | 5 | 5 | 20 | 10 |
| Comparative Example 4 | 100 | 2 | 5 | 14 | 10 |
| Comparative Example 5 | 100 | 15 | 5 | 14 | 10 |
| Comparative Example 6 | 100 | 5 | 2 | 14 | 10 |
| Comparative Example 7 | 100 | 5 | 15 | 14 | 10 |

[Test Example 1]: Measurement of De-NOx Performance of Low-Temperature De-NOx Catalyst for Selective Catalytic Reduction A testing unit for de-NOx performance was configured to include a catalytic reaction part in which a catalyst is provided and reaction occurs, a heater for controlling the temperature of the catalytic reaction part, a preheater for preheating the injected gas, and a temperature control panel and an MFC (mass flow controller) for controlling the temperature and the amount of the injected gas. The temperature of the reactor was adjusted in the range of 150° C. to 200° C., and the three-dimensional metal support (200 cpsi, 5 cm×5 cm×5 cm) catalyst manufactured in each of Examples and Comparative Examples was packed in the reactor, after which gas was allowed to flow into the reactor under conditions of a space velocity (SV) of 10,000 h$^{-1}$. NO gas and NH$_3$ gas were allowed to quantitatively flow in an amount of 50 ppm (v/v), and SO$_2$ gas was allowed to flow in an amount of 100 ppm (v/v). The concentration of O$_2$ was maintained at 4% (v/v), and the total flow rate was maintained using N$_2$. In order to accurately perform the activity test, the reaction test was performed after stabilization was carried out for a predetermined period of time under the corresponding reaction conditions, and the reaction gas was analyzed in a manner in which a change in the NO$_x$ concentration of the gas inlet and the gas outlet passed through the catalyst layer was measured using a gas analyzer (Greenline II) and then the NO$_x$ removal efficiency was calculated using Equation 1 below. The results thereof are shown in Table 2 below.

NO$_x$ conversion (%)=100×[(inlet NO$_x$ concentration−outlet NO$_x$ concentration)/inlet NO$_x$ concentration]    [Equation 1]

TABLE 2

| Classification | NO$_x$ conversion at reaction temperature (%) | | | |
|---|---|---|---|---|
| | 150° C. | 170° C. | 180° C. | 200° C. |
| Example 1 | 78 | 90 | 98 | 99 |
| Example 2 | 76 | 88 | 95 | 97 |
| Example 3 | 74 | 90 | 96 | 99 |
| Example 4 | 77 | 86 | 96 | 97 |
| Example 5 | 75 | 91 | 95 | 99 |
| Comparative Example 1 | 54 | 75 | 80 | 86 |
| Comparative Example 2 | 59 | 83 | 86 | 90 |
| Comparative Example 3 | 58 | 78 | 80 | 86 |
| Comparative Example 4 | 70 | 83 | 88 | 89 |
| Comparative Example 5 | 71 | 82 | 86 | 88 |
| Comparative Example 6 | 68 | 81 | 84 | 87 |
| Comparative Example 7 | 68 | 81 | 85 | 90 |

As is apparent from Table 2, the catalysts of Examples 1 to 5 exhibited better de-NO$_x$ performance than Comparative Examples 1 to 7 in the temperature range of 170° C. to 180° C. in exhaust gas containing sulfur oxide, and in particular, the catalyst of Example 1 showed the greatest de-NO$_x$ performance compared to other catalysts.

[Test Example 2]: Measurement of Resistance to Sulfur Poisoning of Low-Temperature De-NO$_x$ Catalyst for Selective Catalytic Reduction Analysis was performed using an AutoChem 11-2920 Chemisorption Analyzer available from Micromeritics and a ThermoStar 200 Quadrupole Mass Spectrometer available from Pfeiffer Vacuum. The test method was as follows: 0.1 g of the catalyst of each of Examples and Comparative Examples was packed in a reaction device, a total of 100 ml/min of a gas mixture including 5,000 ppm of sulfur dioxide, 3 mol % of oxygen, and the remainder of argon gas was injected at 200° C., adsorption was allowed to occur for 120 minutes, and then the sulfur dioxide that was physically adsorbed was excluded with argon for 30 minutes. Thereafter, the catalyst was heated from 200° C. to 1,000° C. at a rate of 10° C./min, and the intensity of the sulfur dioxide (m/e, molecular weight=64), adsorbed on the surface of the catalyst, that was desorbed depending on the temperature was measured using a mass spectrum analyzer. Here, the area was calculated by integrating the intensity of the desorbed sulfur dioxide depending on the temperature from 200° C. to 1,000° C., and the results thereof are shown in Table 3 below. Here, the area represents the amount of sulfur dioxide adsorbed on 0.1 g of the catalyst, and is a relative value under the present test conditions.

TABLE 3

| Classification | Adsorbed SO$_2$ area |
|---|---|
| Example 1 | 1.1 × 10$^6$ |
| Example 2 | 2.4 × 10$^6$ |
| Example 3 | 1.5 × 10$^6$ |
| Example 4 | 2.0 × 10$^6$ |
| Example 5 | 2.6 × 10$^6$ |
| Comparative Example 1 | 6.9 × 10$^8$ |
| Comparative Example 2 | 3.3 × 10$^7$ |
| Comparative Example 5 | 2.1 × 10$^7$ |
| Comparative Example 7 | 2.9 × 10$^7$ |

As is apparent from Table 3, the area of sulfur dioxide adsorbed on the catalyst manufactured in each of Examples 1 to 5 was smaller than that of the catalyst of each of Comparative Examples 1, 2, 5 and 7, indicating that the catalysts of Examples 1 to 5 exhibited high ability to withstand sulfur dioxide.

[Test Example 3]: Measurement of Abrasion Resistance of Catalyst

The abrasion resistance of the catalyst manufactured in each of Examples and Comparative Examples was measured by a recognized domestic measurement organization through a method of virtually setting the conditions for dust contained in exhaust gas from a coal-fired power plant. Measurement was performed for 30 minutes under conditions of an exhaust gas flow rate of 20 m/sec and an emission amount of 3 kg/h using SiO$_2$ #6 (220 mesh) as an abrasive. The results of measurement of the abrasion rate based on the reduction in the weight of the catalyst before and after measurement are shown in Table 4 below.

TABLE 4

| Classification | Measurement of abrasion resistance Abrasion rate (%) |
|---|---|
| Example 1 | 8.3 |
| Example 2 | 7.5 |
| Example 3 | 8.5 |
| Comparative Example 1 | 12.9 |
| Comparative Example 2 | 14.6 |
| Comparative Example 3 | 22.1 |

As is apparent from Table 4, it was confirmed that the catalysts manufactured in Examples 1 to 3 exhibited superior abrasion resistance compared to the catalysts manufactured in Comparative Examples 1 to 3.

Therefore, the low-temperature de-NO$_x$ catalyst for selective catalytic reduction according to the present disclosure can promote the reduction reaction of nitrogen oxide even at a low temperature by adjusting the optimal amount of vanadium, can increase resistance to sulfur poisoning, and can exhibit superior abrasion resistance while preventing secondary environmental pollution due to the treated gas.

As described above, the present disclosure has been described with reference to limited embodiments, but is not limited thereto, and various modifications and variations are possible within the equivalent range of the technical spirit of the present disclosure and the claims to be described later by those of ordinary skill in the technical field to which the present disclosure pertains.

What is claimed is:

1. A method of manufacturing a low-temperature de-$NO_x$ catalyst for selective catalytic reduction, comprising:
   (a) preparing a first precursor aqueous solution containing a cerium precursor and a niobium precursor;
   (b) continuously adding a titanium precursor aqueous solution to the first precursor aqueous solution and performing co-precipitation to form a co-precipitate;
   (c) coating a metal support with the co-precipitate and then performing primary drying and calcination;
   (d) preparing a second precursor aqueous solution containing a vanadium precursor and a tungsten precursor;
   (e) supporting the second precursor aqueous solution on the metal support obtained in step (c); and
   (f) subjecting the supported metal support obtained in step (e) to secondary drying and calcination.

2. The method of claim 1, wherein the co-precipitate obtained in step (b) comprises 100 parts by weight of a titanium precursor, 3 parts by weight to 10 parts by weight of the cerium precursor, and 3 parts by weight to 10 parts by weight of the niobium precursor.

3. The method of claim 1, wherein the vanadium precursor of the second precursor aqueous solution is contained in an amount of 12 parts by weight to 18 parts by weight based on 100 parts by weight of a titanium precursor, and the tungsten precursor of the second precursor aqueous solution is contained in an amount of 3 parts by weight to 15 parts by weight based on 100 parts of a titanium precursor.

4. The method of claim 1, wherein the co-precipitation in step (b) is performed using a continuous-type homogenizer or a batch-type homogenizer.

5. The method of claim 1, wherein the co-precipitation in step (b) is performed at 20° C. to 100° C. and at a rotation speed of 5,000 rpm to 20,000 rpm.

6. The method of claim 1, wherein the calcination of steps (c) and (f) is performed at 450° C. to 600° C. for 1 hour to 5 hours.

7. A low-temperature de-$NO_x$ catalyst for selective catalytic reduction, manufactured using the method of claim 1 and comprising a catalyst carrier containing titanium and catalyst particles in which vanadium and tungsten are supported on the catalyst carrier and in which cerium and niobium are contained.

8. A low-temperature de-$NO_x$ catalyst for selective catalytic reduction, manufactured using the method of claim 1 and comprising a catalyst carrier containing titanium and catalyst particles in which vanadium and tungsten are supported on the catalyst carrier and in which cerium and niobium are contained, wherein a de-$NO_x$ efficiency of 85% or more is exhibited through a de-$NO_x$ reduction reaction of exhaust gas containing 5 ppm to 200 ppm of sulfur oxide at 170° C. to 180° C.

* * * * *